May 26, 1964
A. MUSSCHOOT ET AL
3,134,483
VIBRATORY DEVICE
Filed June 30, 1961
2 Sheets-Sheet 1
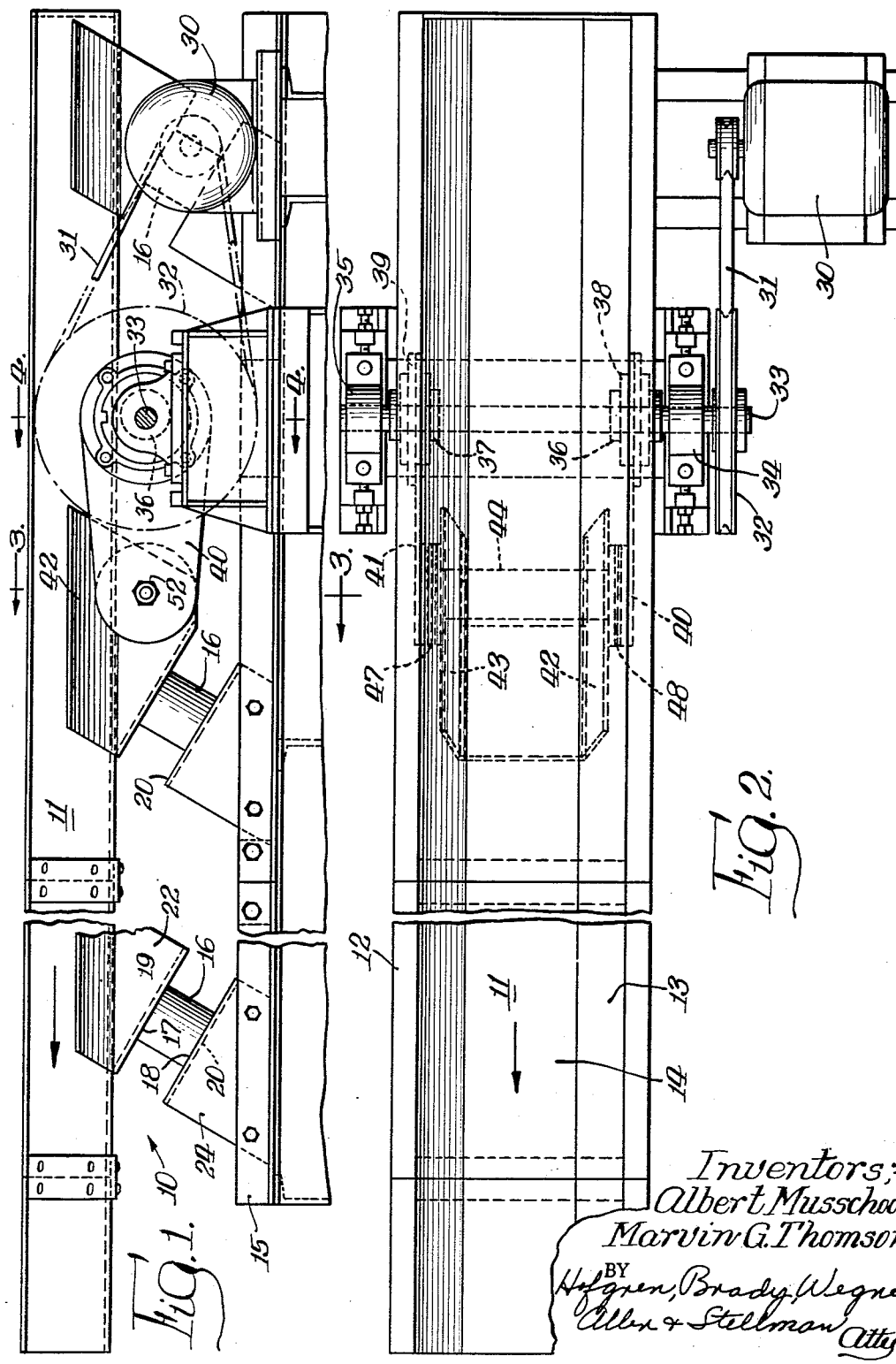
Inventors:-
Albert Musschoot,
Marvin G. Thomson.
BY
Hofgren, Brady, Wegner,
Allen & Stellman Attys.

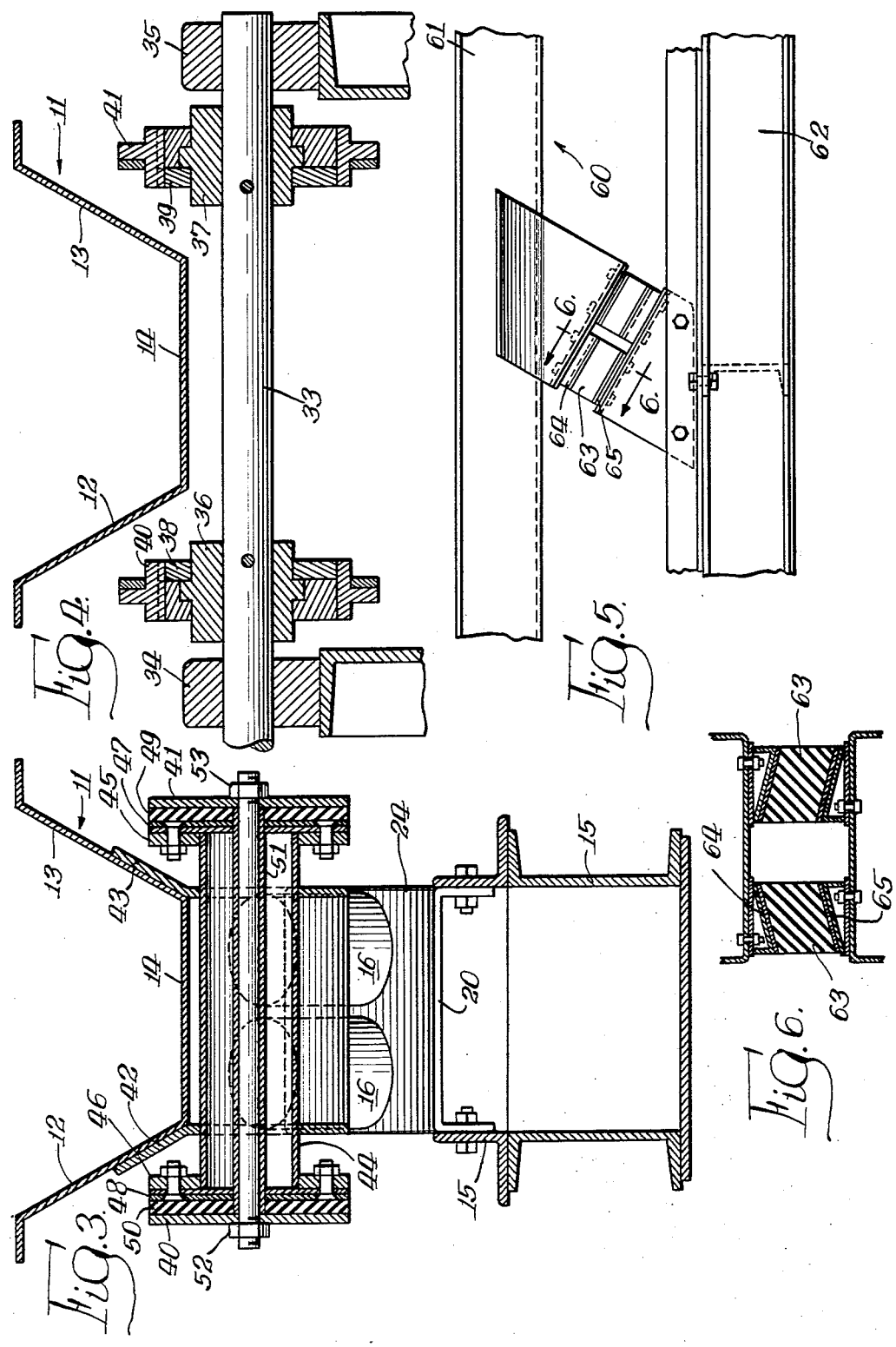

United States Patent Office 3,134,483
Patented May 26, 1964

3,134,483
VIBRATORY DEVICE
Albert Musschoot, Barrington, and Marvin G. Thomson, Prospect Heights, Ill., assignors to General Kinematics Corporation, a corporation of Illinois
Filed June 30, 1961, Ser. No. 121,192
2 Claims. (Cl. 198—220)

This invention relates to a vibratory device and more particularly to a device wherein vibratory forces are utilized to move a pulverulent material along a predetermined path.

It is a general object of the invention to produce a new and improved vibratory device of the character described.

It is a more specific object of the present invention to produce a vibratory device including a material-carrying member such as a trough, which is supported in a unique and novel manner in order that the construction of the supporting means can be simplified and the efficiency of operation of the apparatus increased.

It is a further object of the invention to produce a vibratory apparatus of the type described in the preceding paragraph, in which a vibratory force is applied to the material-carrying member through the medium of a shear spring which may take the form of a rubber block possessing sufficient resilience to minimize the forces required on start-up of the device.

Other and further objects and advantages of the invention will be readily apparent from the following description and drawings, in which:

FIGURE 1 is a side elevational view showing a material conveyor embodying the invention;

FIGURE 2 is a top elevational view of the apparatus shown in FIGURE 1;

FIGURE 3 is a sectional view taken along line 3—3 of FIGURE 1;

FIGURE 4 is a sectional view taken along line 4—4 of FIGURE 1;

FIGURE 5 is a side elevational view of a modified form of support for the conveyor trough; and FIGURE 6 is a sectional view taken along line 6—6 of FIGURE 5.

While this invention is susceptible of embodiment in many different forms, there is shown in the drawings and will herein be described in detail two specific embodiments, with the understanding that the present disclosure is to be considered as an exemplification of the principles of the invention and is not intended to limit the invention to the embodiments illustrated. The scope of the invention will be pointed out in the appended claims.

Referring now to FIGURES 1 and 2 of the drawings, there is shown a conveyor 10 including a material-carrying member in the form of a trough 11 having two sides 12 and 13 and a bottom 14. The trough may be, as shown, generally horizontally arranged, and it is adapted to carry granular or pulverulent material to be transported therealong in the manner to be described. For this purpose the trough 11 is mounted upon a base 15 and supported on the base by resilient shear springs in the form of rubber blocks 16. Each of the rubber blocks may be cylindrical, as shown, and provided with upper and lower faces 17 and 18, respectively, which are parallel to each other and to the direction of vibratory movement, which vibratory movement is transmitted to the trough 11 and thereby to the material carried in the trough.

Plates 19 and 20 are bonded to the upper and lower faces of each block, with the plate 19 being secured to the bottom of U-shaped plate 22 on the trough, and with plate 20 being bolted to U-shaped plate 24 secured to the base.

As the rubber blocks 16 provide the entire support for the trough 11 and any material carried therein, it will be noted that because of the resilient rubber material of which the blocks are made, compression forces will be absorbed, thereby providing a shock mounting for the trough. Also, as the modulus of elasticity of the rubber blocks is six times as great in compression as in shear, the blocks act to restrict the vibratory movement of the trough to a direction parallel to the faces 17 and 18. This is because the frequency of vibration imparted to the trough (approximately 500 per minute in the embodiment shown) is close to the natural frequency of the rubber blocks acting in shear.

For imparting vibratory force to the trough 11, a suitable source of vibratory power is provided, the source including an electric motor 30 mounted on the base and connected by means of a belt 31 to a wheel 32 secured to a shaft 33 rotatably mounted in bearings 34 and 35 supported from the base. The shaft carries eccentrics 36, 37, in turn rotatably supporting bearings 38 and 39 for a pair of crank arms 40 and 41 provided on each side of the trough.

Referring more specifically to FIGURES 3 and 4, it will be noted that a pair of plates 42 and 43 secured to the trough are welded to a shaft 44, thereby securing the shaft to the trough. Also welded to the shaft at the outer ends thereof is a pair of plates 45 and 46, which in turn are bolted to plates 47 and 48 secured to the inner faces of rubber blocks 49 and 50. The outer ends of the crank arms 40 and 41 are held in frictional engagement with the outer faces of the rubber blocks 49 and 50 by means of the rod 51 extending through the center of the shaft 44, and provided with nuts 52 and 53 at the ends thereof for compressing the rubber pads 49 and 50 between the ends of the crank arms and the plates 45 and 46. Thus, the vibratory force generated by the motor 30 in driving the shaft 33 and eccentrics 36 and 37 is transmitted to the crank arms, and by them to the outer faces of the rubber blocks 49 and 50. Acting in shear, the blocks transmit such force to the trough through the medium of the plates 45, 46 and other portions of the apparatus just described.

As is known to those skilled in the art, it is common for more force to be required on the start-up of a vibratory conveyor of the type herein illustrated than during the actual operation thereof, inasmuch as some form of resilient mounting for the trough is normally provided, which mounting tends to return the trough to a center or rest position. Thus, during normal operation, which will be at about the natural frequency, the tendency of the mounting means to return the trough to center, in effect assists the vibratory forces by generating kinetic energy serving to carry the trough beyond the rest position and toward the opposite extreme position and the forces required to be transmitted by the crank arm are of small magnitude. On start-up, however, no such kinetic energy is available and the power supplied by the vibratory source alone must be utilized to effect the first half stroke of the trough. Because of the interposition of the resilient shear blocks 49 and 50, the trough need not be moved as far from the rest position on start-up as would otherwise be necessary, the "give" in shear of the rubber blocks serving in effect as a lost motion connection, permitting the crank arms to travel their full stroke while not requiring a fully corresponding movement of the trough.

The same "give" in shear described above also applies to the rubber mounting blocks 16 which, while providing support for the conveyor, also permit movement of the conveyor in a direction generally parallel to the planes of the top and bottom faces 17 and 18 of the shear blocks. Such movement of the conveyor will in the manner well known, transport material in the trough in the direction indicated by the arrow in FIGURE 1, and the utilization of the type of shear blocks shown for this purpose eliminates the need of separately provided guiding means for the trough to confine its movement to the desired direction.

A further advantage of the rubber shear spring connection between the source of vibratory power and the trough, is that it provides a means of permitting the trough to lower somewhat under load as the load is absorbed by the support block 16 without requiring any repositioning of the crank arm connection or unduly loading the eccentric bearings. Thus, the device is more or less self-compensating for changes in weight.

A somewhat modified form of support block is shown in FIGURES 5 and 6. Referring to those figures, there is provided a conveyor 60 including a trough 61 supported upon a base 62 by means of rubber shear blocks 63, as shown. Referring to FIGURE 6, it will be noted that the shear blocks 63 are not cylindrical in shape, but rather are provided with slanted tops and bottoms 64 and 65, respectively, affording faces which are parallel to each other but slant upwardly toward the conveyor. With the form of rubber shear blocks illustrated in FIGURES 5 and 6, the vibratory motions and generally over-all efficiency of the apparatus are somewhat improved. It will be understood, of course, that the balance of the apparatus shown in FIGURES 5 and 6 is similar to that shown in FIGURES 1–4, inclusive.

We claim:

1. In a vibratory conveyor having a material-carrying trough, a base, resilient means supporting the conveyor on the base, and a source of vibratory power, means for connecting said source of vibratory power with the trough comprising, a horizontally arranged hollow shaft secured to the trough, an apertured plate secured to each end of the shaft, a pair of crank arms connected at one end to said source of vibratory power, a flat washer-like rubber block positioned between the other end of each of said crank arms and said plates, a rod extending through the shaft and the apertures in the plate, said rod also extending through apertures in said other ends of the crank arms, and means threadedly attached to the outer ends of the rod to force said other ends of the crank arms toward the plate to compress the block therebetween.

2. The apparatus described in claim 1 in which said rod is provided with means forming a shoulder at the ends thereof positioned to bear against the inner surface of said other ends of the crank arms so as to limit the pressure applied to said blocks.

References Cited in the file of this patent

UNITED STATES PATENTS

| 2,154,361 | Schieferstein | Apr. 11, 1939 |
| 2,284,692 | Strube | June 2, 1942 |
| 2,444,134 | Hittson | June 29, 1948 |

FOREIGN PATENTS

| 812,033 | Great Britain | Apr. 15, 1959 |

OTHER REFERENCES

German printed application DAS 1,005,899, Apr. 4, 1957.